(12) United States Patent
Bennie et al.

(10) Patent No.: US 6,985,076 B1
(45) Date of Patent: Jan. 10, 2006

(54) METHOD AND SYSTEM FOR DETECTING THE PRESENCE OF A SPARE REPLACEMENT IN A TIRE PRESSURE MONITORING SYSTEM FOR AN AUTOMOTIVE VEHICLE

(75) Inventors: Brian Bennie, Sterling Heights, MI (US); Frederick James Porter, Farmington Hills, MI (US); Leena Shah, Bloomfield Township, MI (US); Thomas Michael McQuade, Ann Arbor, MI (US); Thomas Lee Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,694

(22) Filed: Aug. 7, 2002

(51) Int. Cl.
B60C 23/00 (2006.01)
(52) U.S. Cl. .................. 340/445; 340/447; 340/448; 340/442; 340/444; 340/539.1; 73/146.2; 73/146.5
(58) Field of Classification Search .............. 340/445, 340/447, 448, 442, 444, 539.1; 73/146.2, 73/146.5
See application file for complete search history.

(56) References Cited

U.S. PATENT DOCUMENTS

| | | |
|---|---|---|
| 1,948,427 A | 2/1934 | Moecker |
| 1,954,133 A | 4/1934 | Taylor |
| 2,274,557 A | 2/1942 | Morgan et al. |
| 2,578,358 A | 12/1951 | Jellison |
| 2,589,623 A | 3/1952 | Merritt et al. |
| 3,852,717 A | 12/1974 | Hosaka et al. |
| 3,911,855 A | 10/1975 | Haven |
| 3,965,847 A | 6/1976 | Deming |
| 3,974,477 A | 8/1976 | Hester |
| 4,051,803 A | 10/1977 | Arnone |
| 4,316,176 A | 2/1982 | Gee et al. |
| 4,376,931 A | 3/1983 | Komatu et al. |
| 4,443,785 A | 4/1984 | Speranza |
| 4,494,106 A | 1/1985 | Smith et al. |
| 4,510,484 A | 4/1985 | Snyder |
| 4,574,267 A | 3/1986 | Jones |
| 4,742,476 A | 5/1988 | Schwartz et al. |
| 5,061,917 A | 10/1991 | Higgs et al. |
| 5,109,213 A | 4/1992 | Williams |
| 5,463,374 A | 10/1995 | Mendez et al. |
| 5,517,853 A | 5/1996 | Chamussy |
| 5,569,848 A | 10/1996 | Sharp |
| 5,583,482 A | 12/1996 | Chamussy et al. |
| 5,587,698 A | 12/1996 | Genna |
| 5,589,815 A | 12/1996 | Nishihara et al. |
| 5,600,301 A | 2/1997 | Robinson, III |
| 5,602,524 A | 2/1997 | Mock et al. |
| 5,612,671 A | 3/1997 | Mendez et al. |
| 5,656,993 A | 8/1997 | Coulthard |
| 5,661,651 A | 8/1997 | Geschke et al. |

(Continued)

*Primary Examiner*—Daniel Wu
*Assistant Examiner*—Tai T. Nguyen
(74) *Attorney, Agent, or Firm*—Fredrick Owens

(57) ABSTRACT

A tire pressure monitoring system (12) for a vehicle (10) has a plurality of tires (14a, b, c and d) in respective rolling locations and a spare tire (14e) generating a spare tire identification. A controller (22) starts the timer (44) and sets a tire status to a rolling status, a pending rolling status, a spare status or a pending spare status in response to the timer and the vehicle speed. The controller (22) stores the status and the spare tire identification in the memory.

20 Claims, 16 Drawing Sheets

U.S. PATENT DOCUMENTS

| | | |
|---|---|---|
| 5,717,376 A | 2/1998 | Wilson |
| 5,721,528 A | 2/1998 | Boesch et al. |
| 5,741,966 A | 4/1998 | Handfield et al. |
| 5,790,016 A | 8/1998 | Konchin et al. |
| 5,801,306 A | 9/1998 | Chamussy et al. |
| 5,808,190 A | 9/1998 | Ernst |
| 5,838,229 A | 11/1998 | Robinson, III |
| 5,853,020 A | 12/1998 | Widner |
| 5,880,363 A | 3/1999 | Meyer et al. |
| 5,913,240 A | 6/1999 | Drahne et al. |
| 5,926,087 A | 7/1999 | Busch et al. |
| 5,939,977 A | 8/1999 | Monson |
| 5,959,202 A | 9/1999 | Nakajima |
| 5,963,128 A | 10/1999 | McClelland |
| 5,965,808 A | 10/1999 | Normann et al. |
| 5,969,239 A | 10/1999 | Tromeur et al. |
| 5,990,785 A | 11/1999 | Suda |
| 5,999,091 A | 12/1999 | Wortham |
| 6,002,327 A | 12/1999 | Boesch et al. |
| 6,034,597 A | 3/2000 | Normann et al. |
| 6,043,738 A | 3/2000 | Stewart et al. |
| 6,046,672 A | 4/2000 | Pearman |
| 6,078,252 A | 6/2000 | Kulczycki et al. |
| 6,111,520 A | 8/2000 | Allen et al. |
| 6,161,071 A | 12/2000 | Shuman et al. |
| 6,199,575 B1 | 3/2001 | Widner |
| 6,204,758 B1 | 3/2001 | Wacker et al. |
| 6,218,936 B1 | 4/2001 | Imao |
| 6,225,895 B1 | 5/2001 | Bigelow, Jr. |
| 6,232,875 B1 | 5/2001 | DeZorzi |
| 6,246,317 B1 | 6/2001 | Pickornik et al. |
| 6,259,361 B1 | 7/2001 | Robillard et al. |
| 6,271,748 B1 | 8/2001 | Derbyshire et al. |
| 6,275,231 B1 | 8/2001 | Obradovich |
| 6,278,363 B1 | 8/2001 | Bezek et al. |
| 6,278,379 B1 | 8/2001 | Allen et al. |
| 6,292,096 B1 | 9/2001 | Munch et al. |
| 6,293,147 B1 | 9/2001 | Parker et al. |
| 6,327,570 B1 | 12/2001 | Stevens |
| 6,339,736 B1 | 1/2002 | Moskowitz et al. |
| 6,369,703 B1 | 4/2002 | Lill |
| 6,385,511 B1 * | 5/2002 | Fondeur et al. ............... 701/1 |
| 6,446,502 B1 * | 9/2002 | Normann et al. .......... 73/146.5 |
| 6,448,891 B2 | 9/2002 | Barnett |
| 6,448,892 B1 | 9/2002 | Delaporte |
| 6,453,737 B2 | 9/2002 | Young et al. |
| 6,463,798 B2 | 10/2002 | Niekerk et al. |
| 6,498,967 B1 | 12/2002 | Hopkins et al. |
| 6,518,876 B1 | 2/2003 | Marguet et al. |
| 6,612,165 B2 | 9/2003 | Juzswik et al. |
| 6,667,687 B1 | 12/2003 | DeZorzi |
| 2001/0008083 A1 | 7/2001 | Brown |
| 2002/0008718 A1 | 1/2002 | Obradovich |

* cited by examiner

| Flat Pressure | Low Pressure | High Pressure | Pressure Status |
|---|---|---|---|
| False | False | False | IN_RANGE |
| True | Don't Care | Don't Care | FLAT |
| False | True | Don't Care | LOW |
| False | False | True | HIGH |

FIG. 10

METHOD AND SYSTEM FOR DETECTING THE PRESENCE OF A SPARE REPLACEMENT IN A TIRE PRESSURE MONITORING SYSTEM FOR AN AUTOMOTIVE VEHICLE

CROSS REFERENCE TO RELATED APPLICATIONS

The present invention is related to applications Ser. No. 10/064,688 entitled "Method And System For Mitigating False Alarms In A Tire Pressure Monitoring System For An Automotive Vehicle"; Ser. No. 10/064,693 entitled "Method And System For Resetting Tire Pressure Monitoring System For An Automotive Vehicle"; Ser. No. 10/064,695 entitled "Method And System For Automatically Extending A Tire Pressure Monitoring System For An Automotive Vehicle To Include Auxiliary Tires"; Ser. No. 10/064,687 entitled "Method And System Of Notifying Of Overuse Of A Mini-Spare Tire In A Tire Pressure Monitoring System For An Automotive Vehicle"; Ser. No. 10/064,690 entitled "Method And Apparatus For Identifying The Location Of Pressure Sensors In A Tire Pressure Monitoring System"; Ser. No. 10/064,692 entitled "Tire Pressure Monitoring System With A Signal Initiator"; Ser. No. 10/064,691 entitled "Method And Apparatus For Automatically Identifying The Location Of Pressure Sensors In A Tire Pressure Monitoring System"; Ser. No. 10/065,468 entitled "Method And Apparatus For Reminding The Vehicle Operator To Refill The Spare Tire In A Tire Pressure Monitoring System"; filed simultaneously herewith and incorporated by reference herein.

BACKGROUND OF INVENTION

The present invention relates generally to a tire pressure monitoring system, and more particularly, to a method and system for automatically detecting the identification of a spare tire.

Various types of pressure sensing systems for monitoring the pressure within the tires of an automotive vehicle have been proposed. Such systems generate a pressure signal using an electromagnetic (EM) signal, which is transmitted to a receiver. The pressure signal corresponds to the pressure within the tire. When the tire pressure drops below a predetermined pressure, an indicator is used to signal the vehicle operator of the low pressure.

Various tire manufacturers have suggested various locations for the pressure sensors. Known systems include coupling a pressure sensor to the valve stem of the tire. Other known systems and proposed systems locate the pressure sensors in various locations within the tire wall or tread. Tires are mounted to wheels that are commonly made from steel or aluminum.

For vehicles that have a full size spare, such as trucks and sport utility vehicles, the spare tire is likely to be included when rotating the tires. In the event that a spare tire is not monitored, at some point only three of the rolling tires may report a tire pressure. Many current systems are unable to identify the presence of a spare replacing a rolling tire and thus only three tires register pressures within the system.

It would be therefore be desirable to provide a tire pressure monitoring system that automatically updates when a spare tire replaces a rolling tire.

SUMMARY OF INVENTION

The present invention provides a system and method for automatically updating the tire pressure monitoring system when a spare tire is substituted for a rolling tire. The system is initiated when an expected transmission from the pressure sensor is not received.

In one aspect of the invention, a method for resetting the system due to the replacement of a tire with a spare tire comprises: associating a plurality of rolling tires with a respective plurality of moving locations and a spare tire with a spare location, generating a low warning status from one of the plurality of rolling tires, receiving a wake message from the spare tire after moving the spare tire to a rolling location, resetting the low warning status; and thereafter, generating warning statuses for each tire in the plurality of rolling locations.

In a further aspect of the invention, a method of operating a tire pressure monitoring system comprises measuring a vehicle speed, starting a timer, and determining a rolling status, a pending rolling status, a spare status, and a pending spare status in response to the timer and the vehicle speed.

In a further aspect of the invention, a tire pressure monitoring system for a vehicle has a plurality of tires in respective rolling locations and a spare tire generating a spare tire identification. A controller starts the timer and sets a tire status to a rolling status, a pending rolling status, a spare status or a pending spare status in response to the timer and the vehicle speed. The controller stores the status and the spare tire identification in the memory.

One advantage of the invention is that no operator intervention is required for the replacement of a rolling tire with a spare tire. This prevents the vehicle operator from inadvertently forgetting to reset the system.

Other advantages and features of the present invention will become apparent when viewed in light of the detailed description of the preferred embodiment when taken in conjunction with the attached drawings and appended claims.

DETAILED DESCRIPTION

Figure 1:
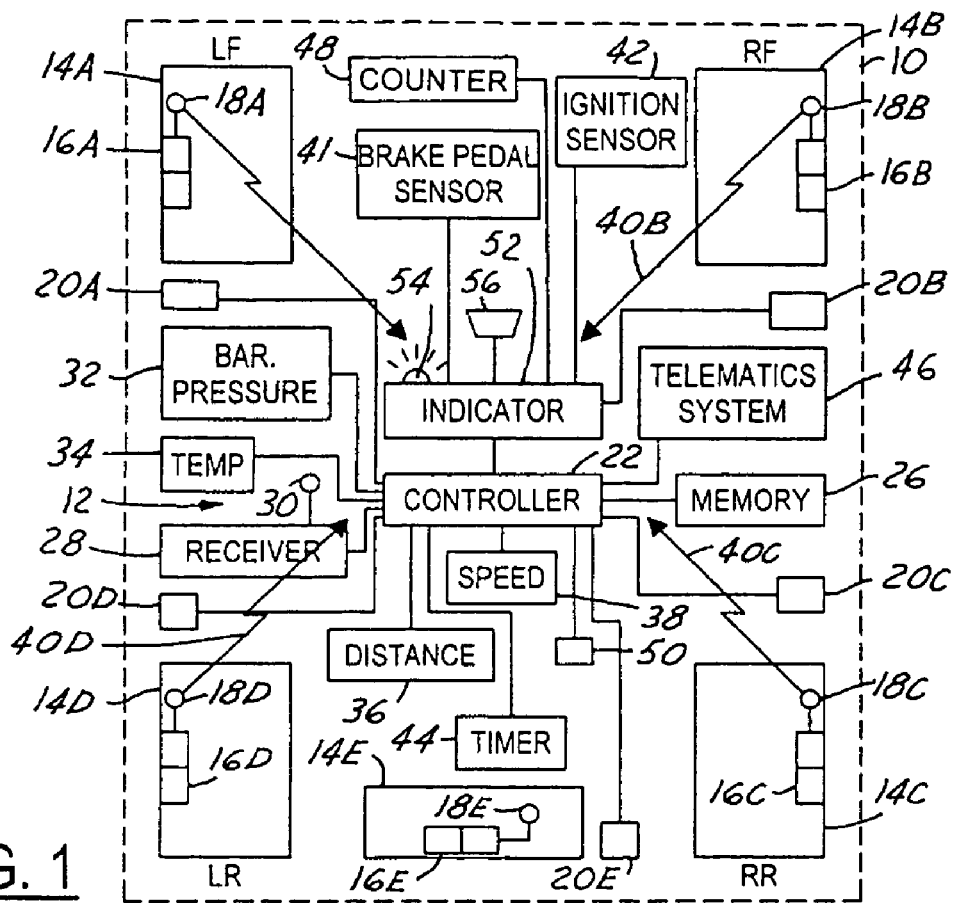
FIG. 1 is a block diagrammatic view of a pressure monitoring system according to the present invention.

In the following figures, the same reference numerals will be used to illustrate the same components. Those skilled in the art will recognize that the various components set forth herein could be changed without varying from the scope of the invention.

Referring now to FIG. 1, an automotive vehicle 10 has a pressure monitoring system 12 for monitoring the air pressure within a left front tire 14a, a right front tire 14b, a right rear tire 14c, and a left rear tire 14d. Each tire 14a–14d has a respective tire pressure sensor circuit 16a, 16b, 16c, and 16d, each of which has a respective antenna 18a, 18b, 18c, and 18d. Each tire is positioned upon a corresponding wheel.

A fifth tire or spare tire 14e is also illustrated having a tire pressure sensor circuit 16e and a respective antenna 18e. Although five wheels are illustrated, the pressure of various numbers of wheels may be increased. For example, the present invention applies equally to vehicles such as pickup trucks that have dual wheels for each rear wheel. Also, various numbers of wheels may be used in a heavy duty truck application having dual wheels at a number of locations. Further, the present invention is also applicable to trailers and extra spares as will be further described below.

Each tire 14 may have a respective initiator 20a–20e positioned within the wheel wells adjacent to the tire 14. Initiator 20 generates a low frequency RF signal initiator and is used to initiate a response from each wheel so that the position of each wheel may be recognized automatically by the pressure monitoring system 12. Initiators 20a–20e are preferably coupled directly to a controller 22. In commercial embodiments where the position programming is done manually, the initiators may be eliminated.

Controller 22 is preferably a microprocessor based controller having a programmable CPU that may be programmed to perform various functions and processes including those set forth herein.

Controller 22 has a memory 26 associated therewith. Memory 26 may be various types of memory including ROM or RAM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table.

Controller 22 is also coupled to a receiver 28. Although receiver 28 is illustrated as a separate component, receiver 28 may also be included within controller 22. Receiver 28 has an antenna 30 associated therewith. Receiver 30 is used to receive pressure and various information from tire pressure circuits 16a–16e. Controller 22 is also coupled to a plurality of sensors. Such sensors may include a barometric pressure sensor 32, an ambient temperature sensor 34, a distance sensor 36, a speed sensor 38, a brake pedal sensor 40, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used but is not required in calculation for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a two wheel used in anti-lock braking systems, or a transmission sensor.

Timer 44 may also be used to measure various times associated with the process set forth herein. The timer 44, for example, may measure the time the spare tire is stowed, or measure a time after an initiator signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

A telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator may be an LED or LCD panel used to provide commands to the vehicle operator when manual calibrations are performed.

Figure 2:
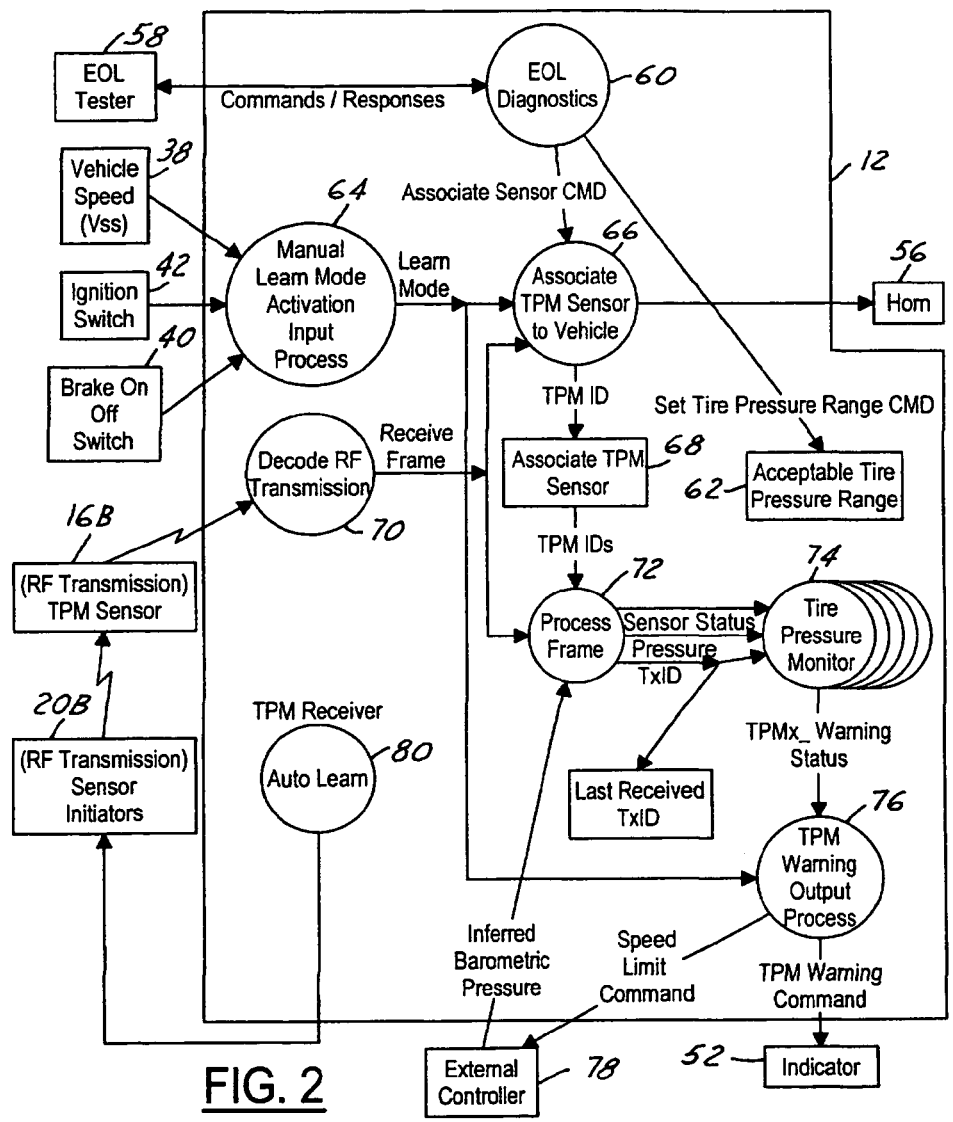
FIG. 2 is a functional flowchart of the monitoring system according to the present invention.

Referring now to FIG. 2, a pressure monitoring system 12 having various functional blocks is illustrated. These functional blocks may take place within receiver 28, controller 22, or a combination thereof. Also, memory 26 is used to store the various ranges. An end-of-line (EOL) tester 58 may also be coupled to pressure monitoring system. EOL tester 58 provides test functions to EOL diagnostic block 60. EOL tester 58 in conjunction with EOL diagnostic block 60 may be used to provide acceptable pressure ranges 62 and other diagnostic functions to determine fault within the system. The EOL tester 58 may be used in the manufacturing process to store various information in the memory such as various thresholds, tire characteristics, and to initially program the locations corresponding to the vehicle tires.

Vehicle speed sensor 38, ignition switch 42, and brake on/off switch 41 may be coupled to a manual learn mode activation input process block 64. Together block 64 and sensors 38, 41, and 42 allow an association block 66 to associate the various tire pressure sensors to the locations of the vehicles. Block 66 associates the various tire pressure sensors in the memory at block 68. The transmissions from the various sensors are decoded in block 70, which may be performed in receiver 28 above. The decoded information is provided to block 66 and to a block 72, which processes the various information such as the ranges, the various sensor locations, and the current transmission process. In the processing frame the sensor status pressure and transmission ID may be linked to a tire pressure monitor 74 which may be used to provide a warning status to an output block 76 which in turn may provide information to an external controller 78 and to indicator 52.

An auto learn block 80 may also be used to associate the various tire pressure sensor monitors with the locations of the tires in the vehicle. This process may replace or be in addition to the manual learn block 64. The auto learn function, however, uses initiators such as the initiator 20b as shown. The various features of FIG. 2 will be described further in more detail.

Figure 3:
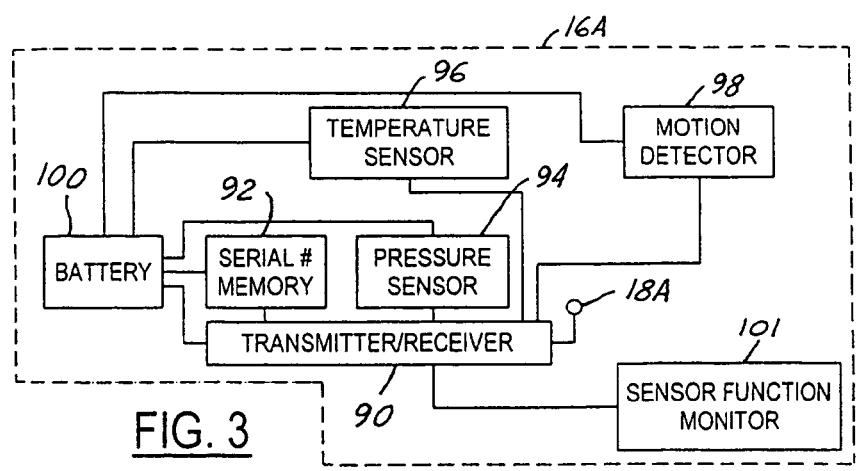
FIG. 3 is a block diagrammatic view of a pressure transmitter according to the present invention.

Referring now to FIG. 3, a typical tire pressure sensor circuit 16a is illustrated. Although only one tire pressure sensor circuit 16 is shown, each may be commonly configured. Pressure monitoring system 12 has a transmitter/receiver or transceiver 90. Transmitter/receiver 90 is coupled to antenna 18a for transmitting various information to receiver 28. The receiver portion may be used to receive an activation signal for an initiator located at each wheel. The pressure sensor may have various information such as a serial number memory 92, a pressure sensor 94 for determining the pressure within the tire, a temperature sensor 96 for determining the temperature within the tire, and a motion detector 98 which may be used to activate the system pressure sensing system. The initial message is referred to as a "wake" message, meaning the pressure sensing circuit is now activated to send its pressure transmissions and the other data.

Each of the transceiver 90, serial number memory 92, pressure sensor 94, temperature sensor 96, and motion sensor 98 coupled to battery 100. Battery 100 is preferably a long-life battery capable of lasting through the life of the tire.

A sensor function monitor 101 may also be incorporated into tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Figure 4:
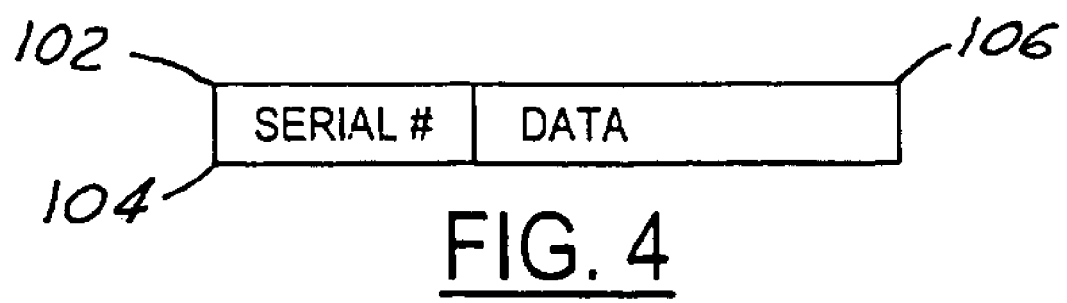
FIG. 4 is a diagrammatic view of a digital word from a pressure transmitter.

Referring now also to FIG. 4, a word 102 generated by the tire pressure sensor circuit 16 of FIG. 3 is illustrated. Word 102 may comprise a transmitter identification serial number portion 104 followed by a data portion 106 in a predetermined format. For example, data section 106 may include a wake or initial status pressure information followed by temperature information. Motion detector 28 may initiate the transmission of the word 102 to the transmitter/receiver 90. The word 102 is preferably such that the decode RF transmission block 70 is able to decode the information and validate the word while providing the identification number or serial number, the pressure, the temperature, and a sensor function.

Figure 5:
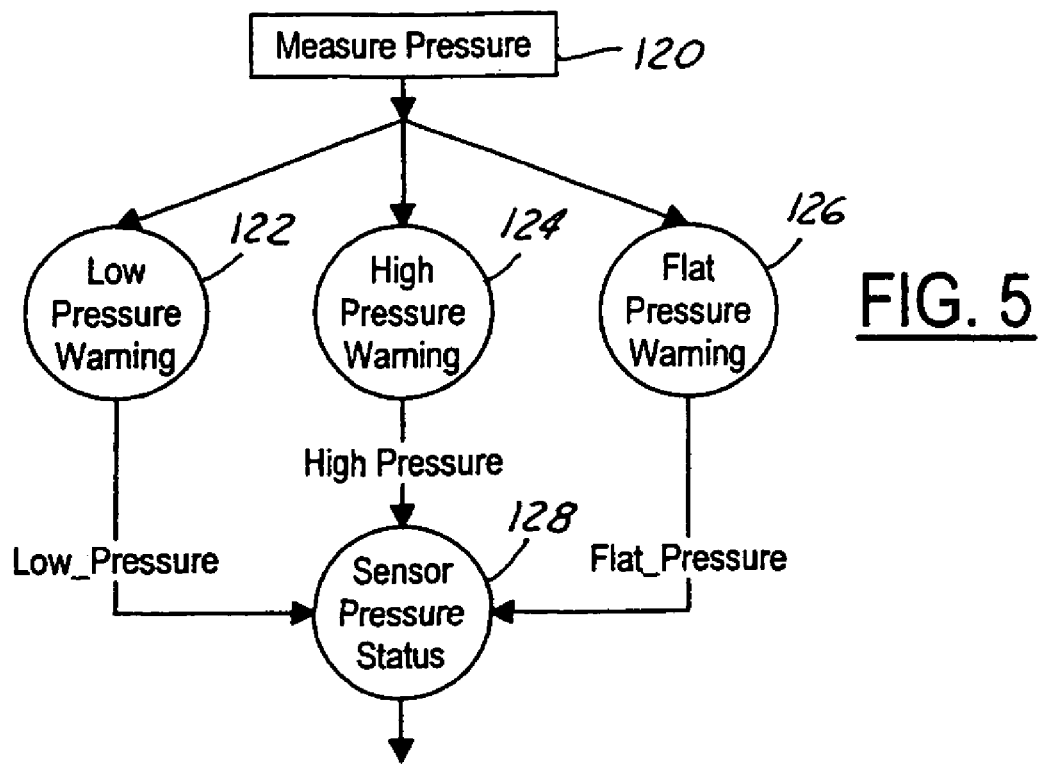
FIG. 5 is a flow chart illustrating determining a pressure status in a first stage of pressure determination according to the present invention.

Referring now to FIG. 5, a high level flow chart illustrating obtaining a sensor pressure status from the measured pressure is illustrated. The pressure status is determined in a similar manner for each of the tires on the vehicle. In block 120 the pressure is measured at the pressure sensor and transmitted to the receiver and is ultimately used in the controller. The pressure measured is compared to a low pressure threshold and a low pressure warning is generated if the measured pressure is below the low pressure threshold. In block 124 if the measured pressure is above the high pressure warning, then a high pressure warning is generated. In block 126 if the measured pressure is below a flat pressure, then a flat pressure warning is generated. In block 128 the pressure status is obtained from blocks 122, 124, and 126. The sensor pressure status is a first stage of pressure monitoring according to the present invention.

Figure 6:
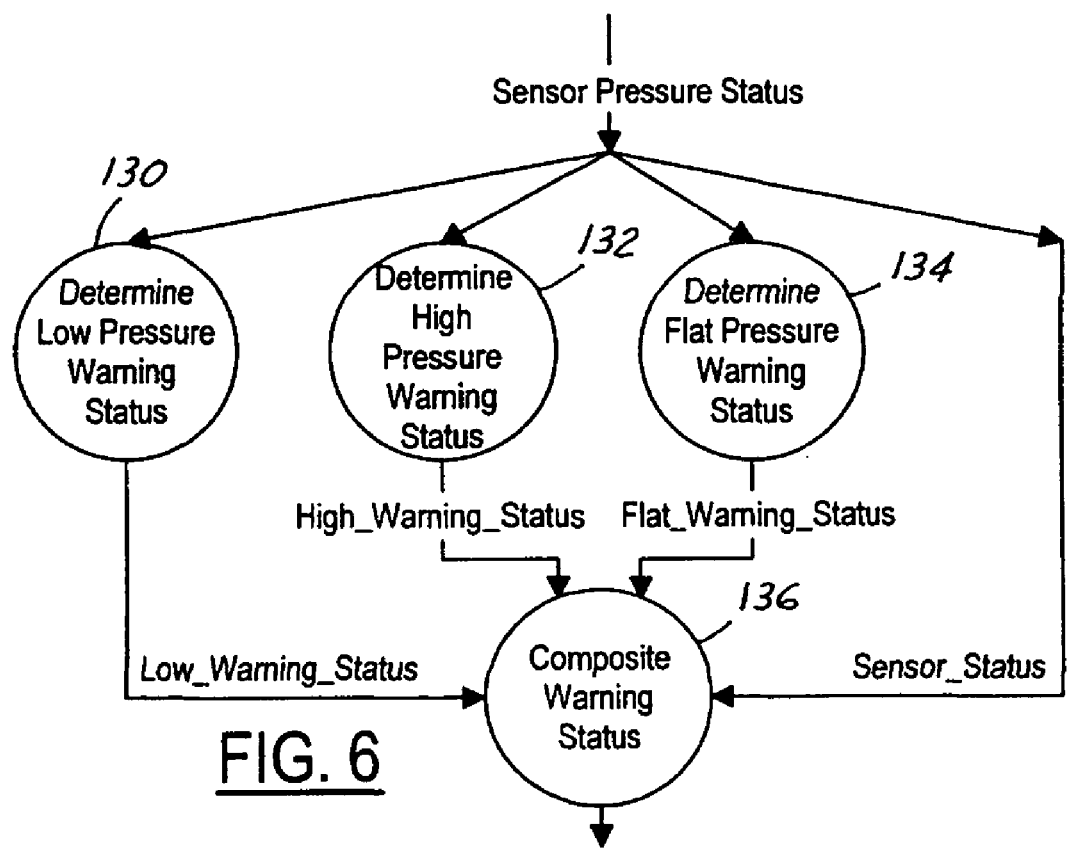
FIG. 6 is a flow chart illustrating determining a warning status in a second stage of pressure determination according to the present invention.

Referring now to FIG. 6, a second stage of pressure monitoring is illustrated in a high level flow chart view. Once the sensor pressure status is obtained in block 128 of FIG. 5, a low pressure warning status, a high pressure warning status, a flat pressure warning status, and an overall sensor status is used to form a composite warning status. In block 130 the low pressure warning status is determined. In block 132 the high pressure warning status is determined. In block 134 a flat pressure warning status is determined. As will be further described below, preferably several measurements take place during normal operation to confirm the status. Each of the low pressure warning status, high pressure warning status, and flat pressure warning status are combined together to form the composite warning status in block 136. The low pressure warning status, the high pressure warning status, and the flat pressure warning status may have two statuses indicative of a warning state indicating the conditions are not met and a not warning state indicating the conditions are not met.

Figure 7:
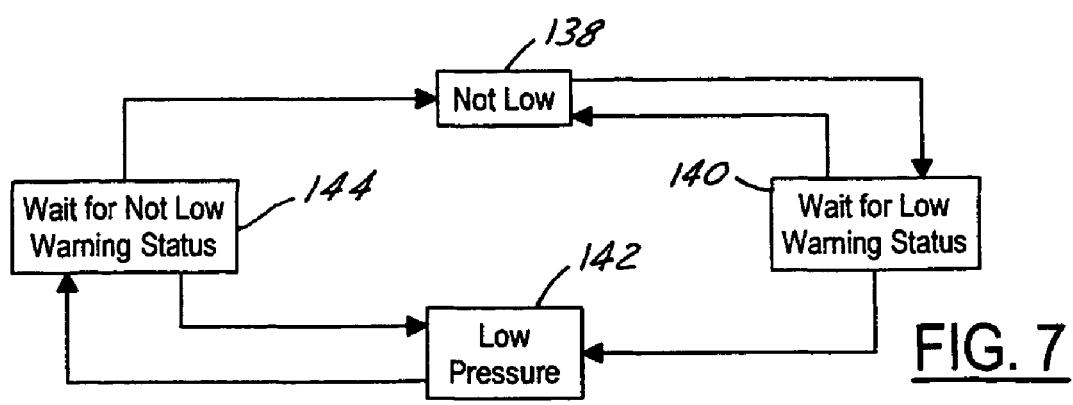
FIG. 7 is a state diagram of low pressure sensor status according to the present invention.

Referring now to FIG. 7, a state diagram for determining the sensor pressure status is illustrated. Block 138 corresponds to a not low sensor status. In the following example, both the front tire pressure and the rear tire pressure may have different threshold values. Also, the spare tire may also have its own threshold values. When any of the tires is below its low pressure threshold and a warning status is not low, block 140 is performed. Of course, those in the art will recognize that some hysteresis may be built into the system so that not exactly the same thresholds may be used to transition back. In block 140 the low warning status is determined in the second stage as will be described below. In block 140 when the warning status is not low and the sensor is equal to or above the threshold for the tire, then the sensor pressure status is not low and the system returns to block 138. In block 140 when a low warning status is determined, then block 142 is performed. In block 142 when the pressure is greater than or equal to the threshold pressure of the associated tire, then block 144 is performed. In block 144 a "not low" warning status is determined as will be further described below. When the tire pressures are less than their associated low thresholds, then block 142 is executed. In block 144 when a warning status of not low is determined, block 138 is executed. Blocks 138 through 144 illustrate a continuous loop in which the sensor readings are monitored and a sensor pressure status and warning status are used to move therethrough.

Figure 8:
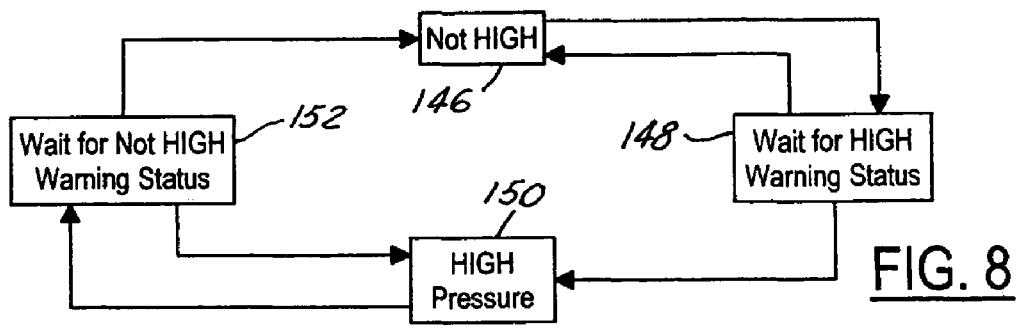
FIG. 8 is a state diagram of high pressure sensor status according to the present invention.

Referring now to FIG. 8, a similar state diagram to that of FIG. 7 is illustrated relative to a high pressure threshold. In block 146 the warning status is not high. To move from block 146 to 148 the pressure of the particular tire exceeds a high pressure threshold. When the pressure reading exceeds one of the high pressure thresholds for one of the tires, block 148 determines a high warning status. A high warning status is determined as will be further described below. When subsequent readings of the pressure sensor are lower than or equal to the high pressure threshold, then block 146 is again executed. In block 148 if the high warning status criteria are met, a high warning status is generated and block 150 is executed. Again, the thresholds may be offset slightly to provide hysteresis. In block 150 when the pressure reading drops below a high pressure threshold then block 144 is executed. If subsequent readings are greater than the high pressure threshold then block 150 is again executed. In block 152 when the not high warning status criteria are met, as will be further described below, a not high warning status is generated and block 146 is again executed.

Figure 9:
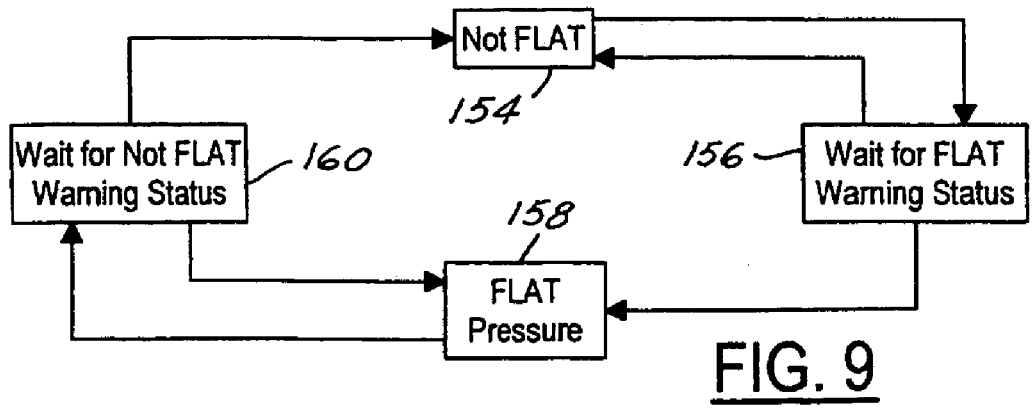
FIG. 9 is a state diagram of a flat pressure sensor status.

Referring now to FIG. 9, a state diagram for determining the presence of a flat tire is illustrated. When the warning status is not flat and the tire pressure for each tire falls below a predetermined flat threshold, then block 156 is executed. Again, the thresholds may be offset slightly to provide hysteresis. In block 56 if a subsequent pressure reading is greater than the flat threshold, then block 154 is again executed. In block 156, if the criteria for generating a flat warning status is met, as will be further described below, block 158 is executed. In block 158 when the pressure reading of a subsequent reading exceeds or is equal to a flat threshold, then block 160 is executed. Block 160 determines a not flat warning status in a similar manner to that of block 156. In block 160 if the subsequent readings drop below the flat warning threshold, then block 158 is again executed. In block 160 if the criteria for not flat warning status is met, then block 154 is executed.

Preferably, the processes shown in FIGS. 7, 8, and 9 are simultaneously performed for each wheel.

Referring now to FIG. 10, the results obtained from FIGS. 7, 8, and 9 are shown in respective columns. True in the columns refers to that pressure threshold being crossed. Thus, the output pressure status shown in the right hand column is "in range" when each of the pressure thresholds are not met. A flat pressure status refers to the flat pressure threshold being met. A low pressure status is obtained when a low pressure threshold is crossed, and a high pressure status when a high pressure threshold is exceeded.

Figure 11:
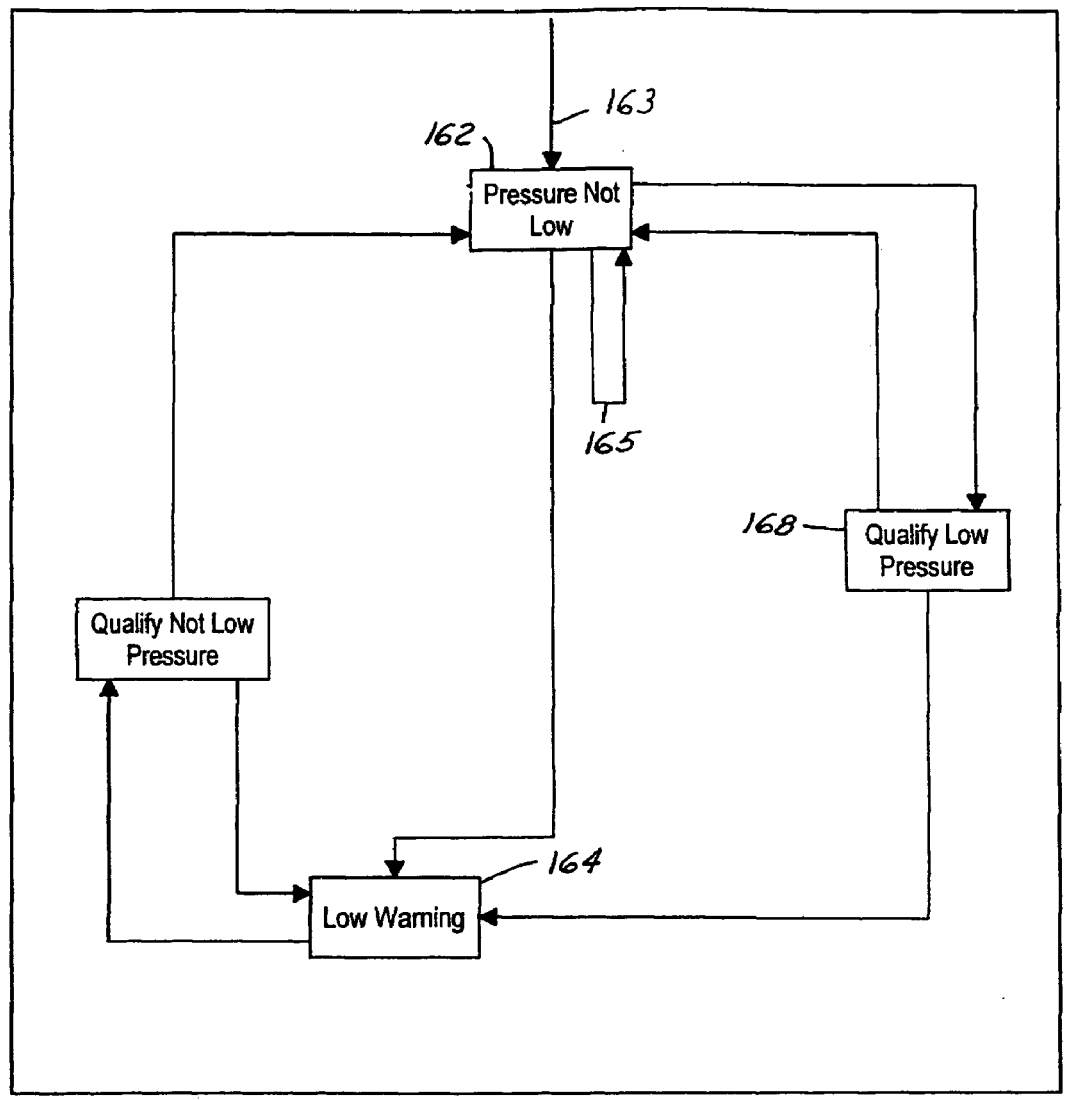
FIG. 11 is a state diagram of a low pressure warning status.

Referring now to FIG. 11, blocks 140 and 144 of FIG. 7 are illustrated in further detail. In each of these blocks the qualification process for either a pressure not low warning status or a low pressure warning status is illustrated. Upon an initial status reading the system is set to a false low warning status as indicated by arrow 163 and block 162 is executed. On the initial status reading, if a low pressure status is obtained in the first reading, block 164 is executed which immediately generates a low warning status. Thus, no waiting periods or other measurements are necessary from an initial standpoint. Loop 165 back to the pressure not low block 162 signifies that the initial value was in range and the status value is not an initial value. When the pressure status signal is low from FIG. 7, a warning qualification process is started in block 168. In block 168 if subsequent pressure status signals are not low, block 162 is executed. In block 168 if a predetermined number of pressure status signals are low or a certain number of pressure status signals over a fixed time period are low, for example five warning events, block 164 is executed. In block 164 when a not low pressure status is obtained a qualification timer is initiated in block 170. If a subsequent low pressure warning is received, then block 164 is again executed. In block 170 if a low warning qualification timer expires, the low warning status if false or "not low pressure" and block 162 is executed. The warning status is initiated as represented by arrow 163 by a wake message received from a spare and the vehicle speed is greater than three miles per hour and the low warning status indicates the tire pressure is not low.

Figure 12:
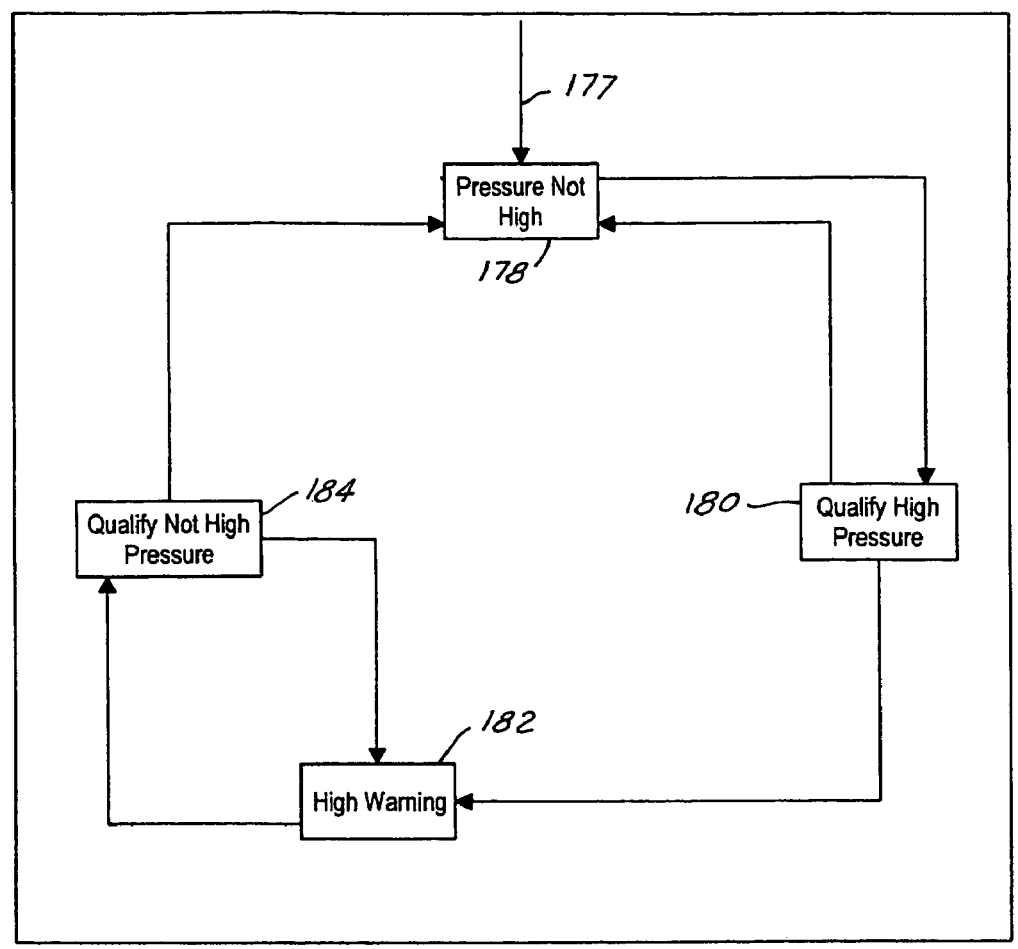
FIG. 12 is a state diagram of a high pressure warning status.

Referring now to FIG. 12, a state diagram of the qualification for generating a warning status for high pressure is illustrated. Once again, an initial step represented by arrow 177 is a default state in which the initial status is set to not high. In block 178 when the pressure sensor status is high, block 180 is executed in which the high pressure is qualified. In the transition from block 178 to 180 a high warning qualification process is initiated. As mentioned above in FIG. 11, the qualification may be a predetermined number of sequential pressure sensor status readings being high or a predetermined number of pressure sensor status readings being high over a predetermined time. In block 180 if a pressure status is not high before qualification, step 178 is re-executed. In block 180 if a predetermined of pressure sensor status readings are high, then a high warning status is generated in block 182. When a high warning status is generated, if a subsequent pressure status is not high then a qualification timer again starts in block 184. In block 184 if a subsequent pressure status is high then step 182 is executed. In step 184 the not high pressure is qualified before issuing a not high warning status. Thus, a predetermined number of not high pressure statuses must be received before qualification. When a predetermined number of not high pressures are obtained, step 178 is again executed.

Figure 13:
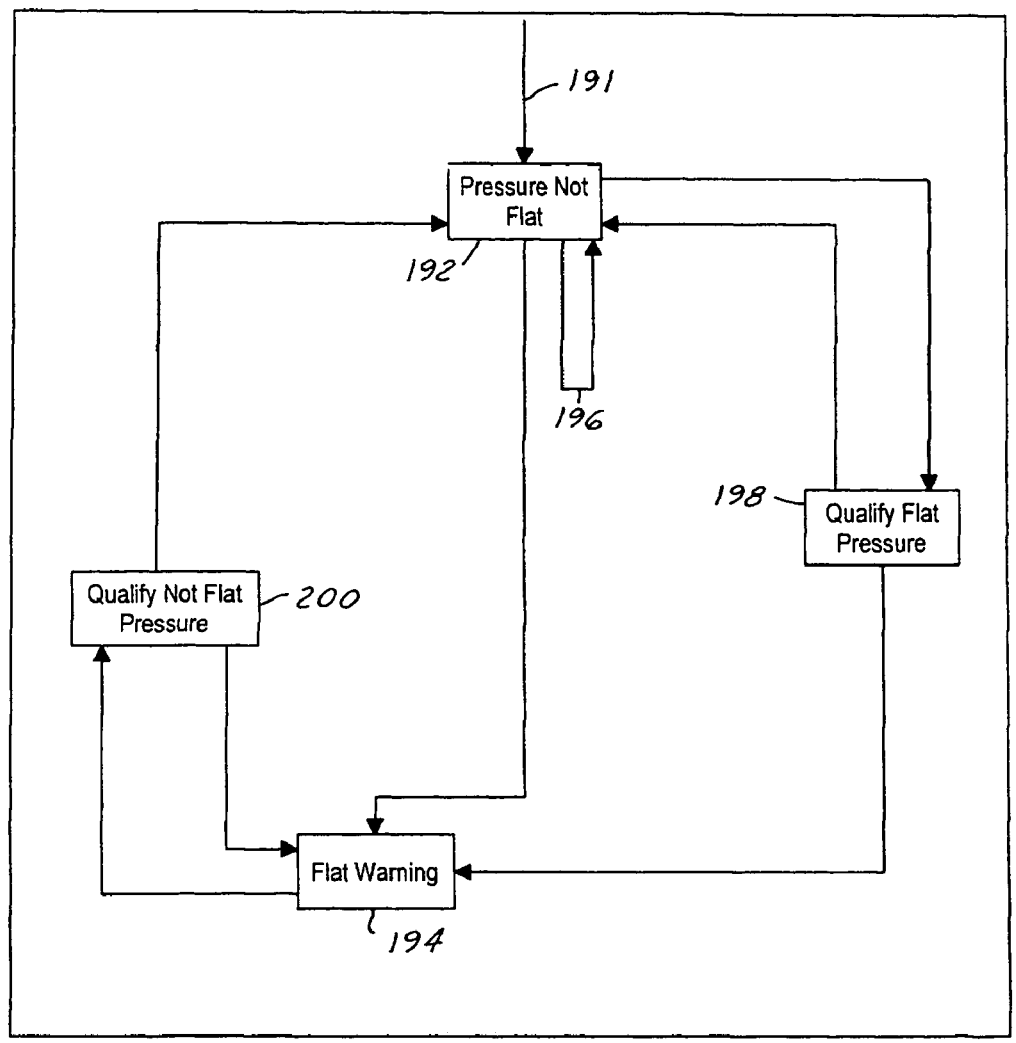
FIG. 13 is a state diagram of a flat pressure warning status.

Referring now to FIG. 13, a flat warning status is generated in a similar manner to the low warning status of FIG. 11. The difference between flat warning and low warning is the flat warning is a substantially lower pressure than the flat warning. This system also begins when a wake up message is received and the speed is greater than three miles per hour. Other considerations may also initiate the process. The default is illustrated by arrow 191. When the first pressure status reading is obtained and the pressure sensor status indicates a flat tire, a flat warning status of true is provided in block 194. Loop 196 resets the initial value flag to false after the initial status value is received. In block 192 if a subsequent sensor pressure status is flat, a qualification timer is initiated in block 198. In block 198 if a not flat sensor pressure status is received, block 192 is again executed. In block 198 if the qualification process has a predetermined number of flat warning events, either consecutively or during a time period, block 194 is executed. In block 194 if a not flat sensor pressure status is obtained a not flat pressure qualification process is initiated in block 200. In block 200 if a subsequent flat warning is received, block 194 is again executed. In block 200 if a predetermined number of not flat pressure statuses are provided, the flat warning status is not false, then block 192 is again executed.

As mentioned above in FIG. 6, the output of the warning status generators of FIGS. 11, 12, and 13 generate a composite warning status as illustrated by the following table.

TABLE

| Sensor Status | Flat Warning Status | Low Warning Status | High Warning Status | Composite Warning Status |
|---|---|---|---|---|
| Don't Care | TRUE | Don't Care | Don't Care | Flat |
| Don't Care | False | TRUE | Don't Care | Low |
| Don't Care | False | False | TRUE | High |
| Transmitter Fau | False | False | False | Fault |
| In Range | False | False | False | In Range |

Thus, the composite warning status has an independent flat warning status portion, a high warning status portion, and a low warning status portion. Also, the composite warning may also include a sensor status portion to indicate a transmitter fault on behalf of the pressure sensor. In response to the composite warning status signal, the tire pressure monitoring system may provide some indication through the indicator such as a displayed word, a series of words, an indicator light or a text message that service or adjustment of the tire pressure may be required.

Figure 14:
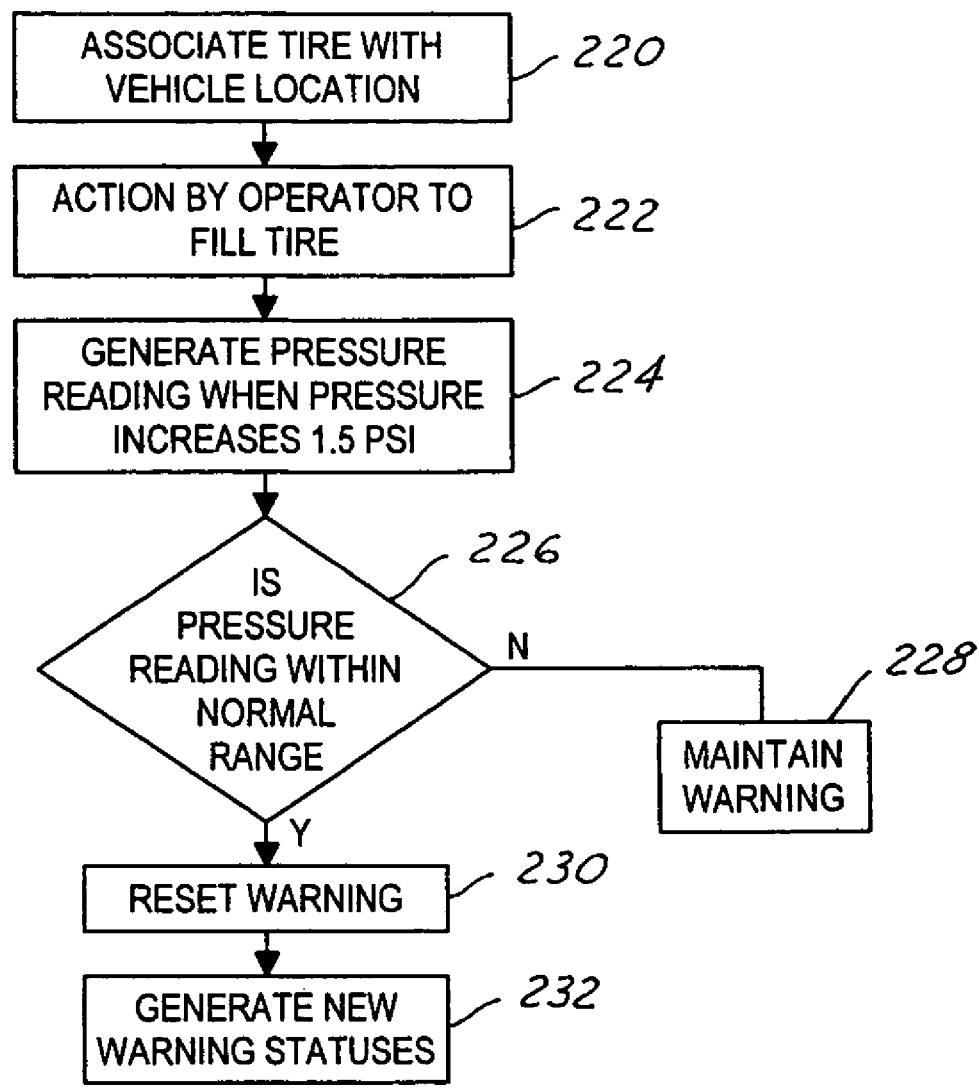
FIG. 14 is a flowchart of the operation of the system when a tire pressure is increased by filling.

Referring now to FIG. 14, a method for automatically updating the system when a pressure suddenly increases. In step 220 the tires are associated with the vehicle locations. Various methods for associating the vehicle tire locations are described herein. In step 222 the operator fills the tire and thereby increases the pressure therein. In step 224 the pressure sensor circuit preferably transmits a pressure reading when an increase of a predetermined amount is sensed. In the present example, 1.5 psi is used. Thus, when the pressure is at least 1.5 psi the system receives a pressure warning from that tire. In step 226 the increased pressure reading is compared to a normal range. If the pressure increase still does not provide a pressure reading within the normal range the warning statuses are maintained in step 228. In step 226 when the new pressure reading is within the normal range the warnings are automatically reset in step 230 for that particular time. The displays and the warning status memory may all be reset.

In step 232 new warning statuses are generated for each of the rolling locations of the vehicle. Also, a new status may also be generated for a spare tire.

Figure 15:
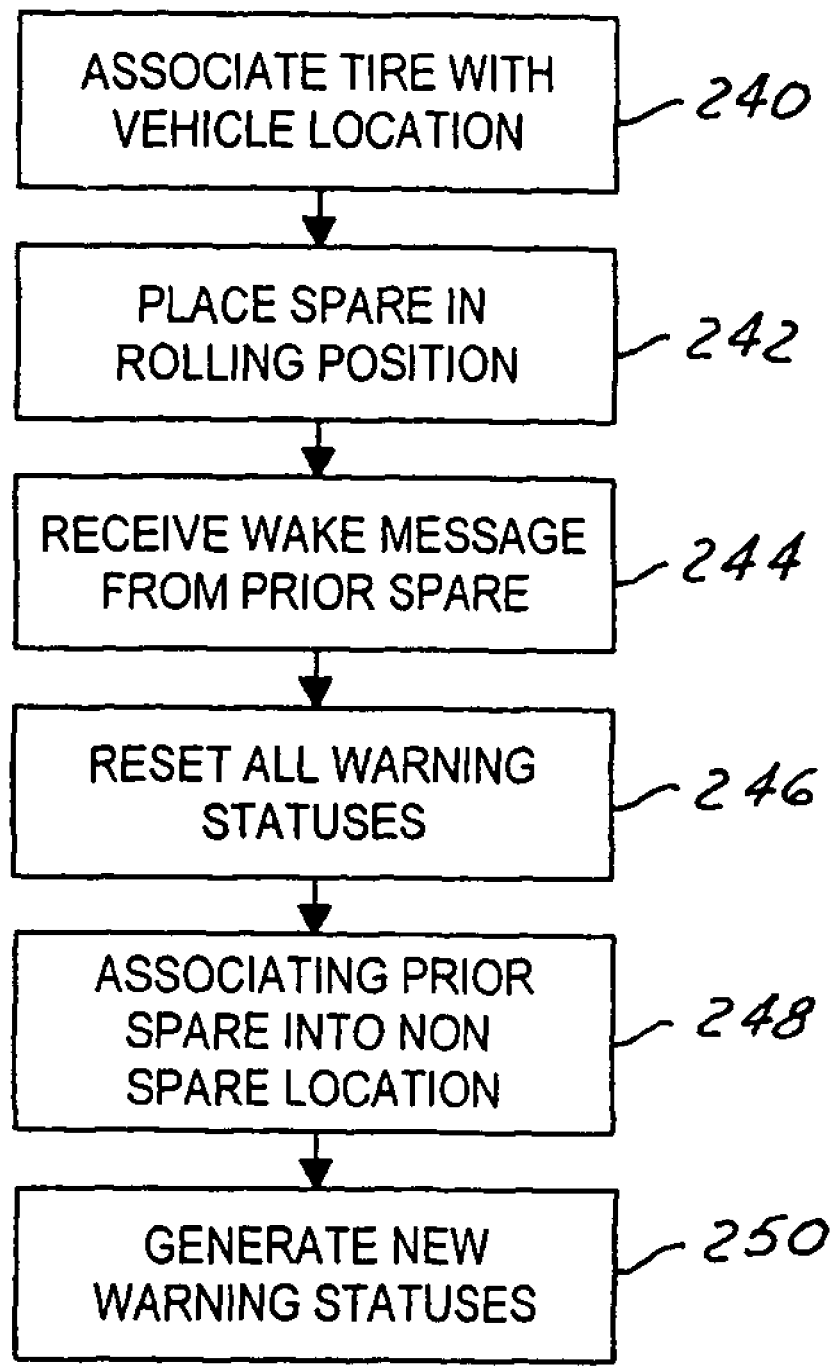
FIG. 15 is a flowchart of the operation of the system when a spare tire is placed into the rolling position.

Referring now to FIG. 15, the present invention preferably automatically updates the warning statuses of the system in response to increased tire pressure that indicates replacement of one of the tires with the spare tire. In step 240 each tire is associated with a rolling location in the vehicle. The spare tire is associated with the spare tire location. Various methods for associating as described above may be used. In step 242 the vehicle operator places the spare tire into a rolling position. Preferably, the spare tire is placed in the rolling tire position with a low tire pressure. However, the present invention does not rely upon proper placement. In step 244 the prior spare tire is awakened when rolling movement is provided. The system recognizes that this tire was a previous spare tire and thus now places the spare tire identification into the memory. Thus, the previously spare tire is now associated with a rolling location. When the previously spare tire is associated with a rolling location the warning statuses in the warning status memory are reset in step 246. In step 248 the previous spare may be associated into the rolling, non-spare, location in the memory after the warning status is generated or in step 244 as mentioned above. In step 250 new warning statuses are generated for the rolling locations that include the previous spare tire.

The resetting of the warning statuses in step 246 may include resetting the display on which each of the warning statuses are displayed.

Figure 16:
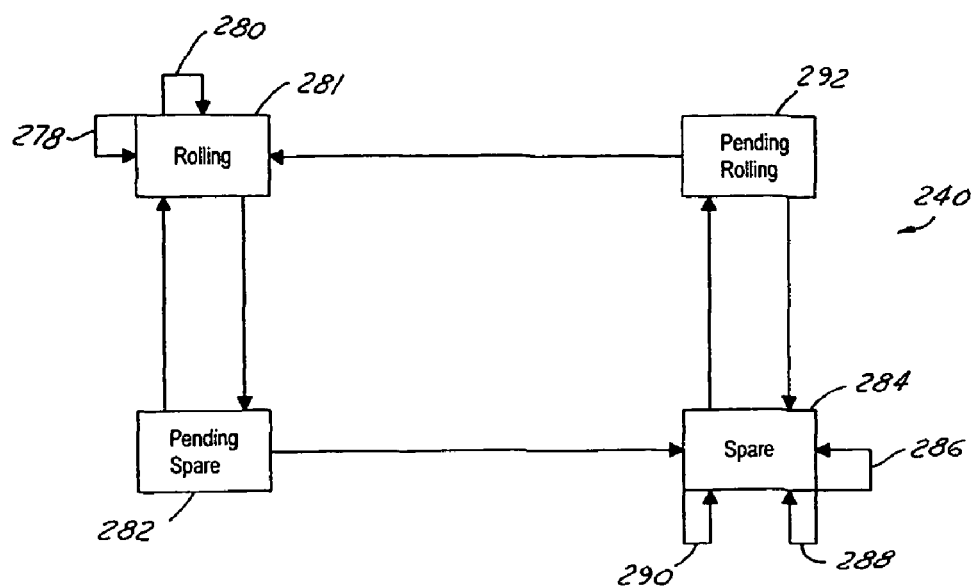
FIG. 16 is a state diagram of the spare tire identification according to the present invention.

Referring now to FIG. 16, step 240 is illustrated in more detail. The system starts in block 281 when a message expected from a tire is missed by the control system. The missed message may, for example, be from a fourth tire in a four tire system that has been replaced with another tire such as a spare. The missed message initiates a timer represented by arrow 278. If a message is received before a predetermined time, and the tire is a rolling tire and the timer is stopped as represented by arrow 280. When the timer expires and the vehicle speed is indicative of the vehicle moving in block 281, the tire status is set to a pending spare as represented by block 282. If the vehicle stops moving the tire status is again set to rolling.

Referring back to block 282, when the status is a pending spare status and any of the other tires have a pending rolling status block 284 is executed in which the tire status is set as a spare status. When the tire status is set to spare and a pressure message is received and the vehicle is moving, a counter is initiated and a timer is started as illustrated by arrow 286. If the timer expires, the count is set to zero as represented by arrow 288 and the spare tire status is maintained. Likewise, if the vehicle is not moving the counter is reset to zero and the timer is stopped as represented by arrow 290. In this manner the spare tire status is maintained. If the counter counts to a predetermined count indicative of a number of messages received, the tire status is set to pending rolling and the count is reset to zero as represented by block 292. In block 292 if the vehicle stops moving the tire status is once again returned to spare status and the functions described above with respect to block 284 are executed. In block 292, if any of the other tire statuses is a pending spare status, then the tire status is rolling and the system returns to block 281.

From the above, it is evident that the vehicle speed sensor and a timer are used to distinguish the various statuses of the vehicle. Thus, when an expected transmission is missed, the system recognizes the spare tire and stores the spare tire identification within the system along with the status. Thereafter, the spare tire becomes recognized as one of the rolling tires and thus the system operates receiving normal updates from each of the tires at the rolling positions. As can be seen at least one tire must be in a pending rolling status and one in a pending spare status for the system to change the status. This indicates the movement of one tire. Also, this system presumes that the identification of the spare is known.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a tire pressure monitoring system comprising:
   measuring a vehicle speed;
   starting a timer;
   receiving a tire identification; and
   setting a tire status corresponding to said tire identification number to a rolling status, a pending rolling status, a spare and a pending spare in response to said timer and said vehicle speed.

2. A method as recited in claim 1 wherein setting a tire status comprises setting a second tire status to said rolling status when a first tire message is missed and a second tire message is obtained.

3. A method as recited in claim 1 wherein setting a tire status comprises setting the first tire status to spare when the first tire message is received, the vehicle is moving and a predetermined number of tire messages are not received when the vehicle is moving.

4. A method as recited in claim 1 wherein setting a tire status comprises setting a tire status to the pending spare status after a missed message with no subsequent message after a predetermined time and the vehicle is moving.

5. A method as recited in claim 1 wherein setting a tire status comprises setting a tire status to the pending rolling status when a count initiated when a message received and the vehicle is moving does exceed a predetermined count.

6. A method as recited in claim 1 wherein said timer comprises a countdown timer.

7. A method as recited in claim 1 wherein the step of receiving the tire identification comprises receiving an identification number not stored in a system memory.

8. A method as recited in claim 7 wherein setting the tire status comprises saving the tire status in the memory.

9. A method as recited in claim 1 wherein saving the tire status in a memory comprises saving the tire status and the tire identification number in the memory.

10. A method of determining the position of a first tire in a tire pressure monitoring system having a plurality of tires in a plurality of rolling locations and a spare location comprising:
   detecting a vehicle speed;
   starting a timer;
   detecting a status of said plurality of tires;
   receiving a tire identification signal for a first tire;
   upon the expiration of timer and a vehicle speed indicative of vehicle movement, setting a pending spare status;
   when the first tire status is said pending status and the status of one of the plurality of tires has a pending rolling status, setting the first status to a spare status;
   when the first tire status is spare status, initiating the timer when the tire identification is received and the vehicle speed indicative of vehicle movement;
   when a predetermined number of tire identification signals are received, setting the first tire status to pending rolling and resetting the counter;
   when the status is pending rolling and the vehicle is not moving, setting the first tire status to spare; and
   when the first tire status is pending rolling and at least one of the plurality of tire statuses is pending spare, setting the first tire status to rolling.

11. A method as recited in claim 10 wherein said timer comprises a countdown timer.

12. A method as recited in claim 10 wherein setting the tire status comprises saving the tire status in the memory.

13. A method as recited in claim 12 wherein saving the tire status in a memory comprises saving the tire status and the tire identification number in the memory.

14. A tire pressure monitoring system for a vehicle comprising:
   a vehicle speed sensor generating a vehicle speed signal;
   a warning status memory having warning statuses therein;
   a timer generating a time signal;
   a spare tire having a spare tire transmitter generating a spare transmitter identification signal; and
   a controller coupled to the spare tire, said controller starting said timer in response to a missing signal, receiving the spare tire identification signal, setting a tire status to a rolling status, a pending rolling status, a spare status and a pending spare status in response to said timer and said vehicle speed signal.

15. A system as recite in claim 14 wherein said controller associates a warning status with said tire identification number.

16. A method for operating a tire pressure monitoring system comprising:
   associating a plurality of rolling tires with a respective plurality of moving locations and a spare tire with a spare location;
   generating a low warning status from one of the plurality of rolling tires;
   receiving a wake message from the spare tire after moving the spare tire to a rolling location;
   resetting the low warning status; and
   thereafter, generating warning statuses for each tire in the plurality of rolling locations.

17. A method as recited in claim 16 wherein the receiving the wake message comprises generating the wake message in response to spare tire motion.

18. A method as recited in claim 16 further comprising changing an indicator in response to resetting the warning status.

19. A method as recited in claim 16 wherein resetting the low warning status comprises clearing a memory.

20. A tire pressure monitoring system for a vehicle comprising;
   a warning status memory having warning statuses therein;
   a plurality of tires in respective rolling locations, each of said plurality of tires having a transmitter;
   a spare tire in a spare location having a spare transmitter;
   a controller coupled to the spare tire transmitter and the warning status memory, said controller receiving a wake signal from a spare tire generated in response to spare tire movement, said controller clearing said warning status from the warning status memory and, thereafter monitoring the tires in the rolling locations and generating warning statuses therefor.

* * * * *